United States Patent [19]

Proctor et al.

[11] 4,367,376

[45] Jan. 4, 1983

[54] ELECTRONIC TELEPHONE RINGER INCLUDING ANTI-BELL TAP PROVISIONS

[75] Inventors: D. Frederic Proctor, Redmond, Wash.; Darrell D. Cole, Newberg, Oreg.

[73] Assignee: Proctor & Associates Co., Redmond, Wash.

[21] Appl. No.: 188,064

[22] Filed: Sep. 17, 1980

[51] Int. Cl.³ ............................................. H04M 1/00
[52] U.S. Cl. .................................................. 179/84 T
[58] Field of Search ................. 179/84 R, 84 L, 84 T, 179/81 R; 340/384 E

[56] References Cited

U.S. PATENT DOCUMENTS

| | | | |
|---|---|---|---|
| Re. 28,283 | 12/1974 | Cowpland et al. | 179/84 T |
| 3,763,326 | 10/1973 | Murto et al. | 179/84 T |
| 3,965,307 | 6/1976 | Dimmer | 179/84 T |
| 4,214,131 | 7/1980 | Bush et al. | 179/84 T |
| 4,276,448 | 6/1981 | Embree et al. | 179/84 T |

*Primary Examiner*—Joseph A. Popek
*Attorney, Agent, or Firm*—Christensen, O'Connor, Johnson & Kindness

[57] ABSTRACT

An electronic ringer circuit suitable for use as a replacement for, or an alternative to, the electromagnetic ringer of a telephone set and other station apparatus is disclosed. To eliminate bell tap, each of the disclosed arrangements includes a load impedance that is connected across the output terminals of a rectifier-power supply stage until an acceptable ringing signal is detected. The load impedance is then disconnected and the signal provided by the rectifier power supply stage activates a tone generator stage that drives a piezoelectric transducer. Various arrangements are provided, including configurations for single-party bridged ringing installations, multi-party divided ringing installations, coded ringing for use in situations wherein a number of stations are located in the same acoustic environment, and a multi-line installation such as a small key telephone installation.

22 Claims, 4 Drawing Figures

ELECTRONIC TELEPHONE RINGER INCLUDING ANTI-BELL TAP PROVISIONS

BACKGROUND OF THE INVENTION

This invention relates to alarms and signaling apparatus for generating an audible signal in response to an applied electrical signal. More specifically, this invention relates to circuit arrangements for generating an acoustic signal wherein the arrangement is suitable for use as a replacement for (or alternative to) the electromagnetic ringers or bells that are utilized in communications equipment such as conventional telephone sets and other telephone station apparatus.

Numerous arrangements that include electronic circuitry and an electroacoustic transducer have been proposed as an alternative or replacement for conventional electromagnetic ringers of telephone sets and other telephone station apparatus. Nevertheless, the prior art has not provided an arrangement which exhibits overall performance characterics equal to, or in many cases, even approaching those of the various readily available electromagnetic ringing devices. Thus, prior to the present invention, the use of electronic ringers or, as they are sometimes identified, tone ringers has been primarily limited to special purpose station apparatus wherein the desirability or necessity of one or more features of an electronic ringer offsets the resulting compromises relative to other characteristics, including various performance parameters and factors such as cost.

In general, the problems associated with developing an electronic ringer that is suited for widespread usage within various types of telephone sets and other apparatus have not been related to physical characteristics such as size and weight, nor has a serious problem been encountered relative to device reliablity. In fact, the inherent reliability and long service life of properly designed electronic circuits has been one of the primary motivations in attempting to replace conventional electromagnetic ringers with electronic ringing apparatus. Further, although presently available electromagnetic ringers are of relatively low mass and are small in size, state of the art circuit design techniques, including the use of integrated circuit technology, permit realization of electronic ringers of suitable size and weight.

Although providing a highly discernible audible signal of acceptable level and tonal quality while simultaneously achieving the desired size, weight and reliability places additional constraints on the designer of electronic ringer apparatus, the primary problems encountered relate to configuring the electronic ringer so that it is compatible with various subscriber loops that are utilized in present day telephone systems. In this regard, the primary requirement is that the ringer device must detect and be responsive to the ringing signal that is supplied by the telephone central office serving that subscriber. As is known in the art, the ringing signal conventionally employed is a relatively low frequency, high amplitude alternating current that is intermittently or cyclically coupled to the station equipment being signalled via the subscriber loop. For example, the ringing cycle of a typical telephone system may include approximately a two-second interval of alternating current having an amplitude of approximately 80–90 volts rms and a nominal frequency of 20 hertz, followed by an interval of approximately four seconds in which no alternating current signal is provided, with the ringing cycle being repeated until the called party answers or the calling party terminates the attempted call.

One problem encountered in attempting to utilize electronic circuitry to detect the ringing signal is that the signal must be detected in the presence of a wide variety of numerous other signals that are intentionally and unintentionally coupled to the telepone line even though the amplitude of the ringing signal varies over a wide range and various frequency ringing signals are employed. For example, variations in the signal level supplied by conventional ringing generators and variations in loop impedance can result in ringing signals which range in amplitude between 40 and 150 volts rms (at the station apparatus), at a frequency of between approximately 16 and 66 hertz, depending on the particular telephone installation of concern.

As is known to those skilled in the art, various transient signals that are encountered on the telephone line exhibit a signal level comparable to the above-mentioned range of riging signal. In fact, such transient signals can include several repetitive pulses at a repetition rate similar to the signal frequency of conventional ringing generators. For example, conventional telephone dial-pulsing apparatus utilizes a nominal pulse repetition rate of approximately ten pulses per second with a nominal 60% make-break ratio. Dial-pulsing, as well as numerous other supervisory and switching operations that are performed in a conventional telephone system, can cause a signal to be coupled to the associated station apparatus at an amplitude that exceeds the telephone system DC supply voltage (normally 48 volts), especially when the supervisory or switching operation being performed operates central office relays or other devices that establish a collapsing electromagnetic field. These high-level, transient signals are undesirable and often cause a condition referred to as "bell tap" wherein a conventional electromagnetic ringer is momentarily energized and emits a ringing signal of less than normal time duration.

Although bell tap has been somewhat of a problem with respect to electromagnetic ringers, the analogous problem of designing an electronic ringer that, in effect, discriminates between actual ringing signals and somewhat similar high voltage transients or other signals appearing on the telephone line has been far more troublesome. In particular, the designer of an electromagnetic ringer can control or adjust the mass and other physical constants associated with conventional electromagnetic ringers so that the ringer, in effect, acts as a filter network that does not allow the striker or hammer of the ringer to contact the bell surface unless the electrical energy supplied to the ringer coil substantially corresponds to that which would be supplied by an actual ringing signal. Although various attempts have been made to design a detector circuit for an electronic ringer that is an electrical analog of an electromagnetic ringer, an arrangement suited for use in actual practice has not been heretofore realized.

Not only must a satisfactory electronic ringer in effect discriminate between actual ringing signals and other signals appearing on the telephone line, but such a ringer must not adversely affect the transmission characteristics of the telephone line with which it operates and must not interfere with the various DC supervisory functions of conventional telephone systems. For example, to maintain proper signal balance and low noise when an electronic ringer is utilized in a divided ringing situation, i.e., connected between earth ground and the tip or ring conductor of a two-wire telephone pair, the electronic ringer must exhibit a relatively high impedance. Further, in many installations, an electronic ringer must be AC coupled to the telephone line so that a DC signal does not flow through the ringer that would be detected by conventional central offices as either an indication of a station set off-hook condition or excessive signal leakage within that particular telephone loop. In addition, since conventional telephone systems utilize a power source that is independent of commercial power distribution systems in order to remain operational during periods of commercial power failure, it is desirable and even necessary for an electronic ringer to derive all of its operating power from the telephone line. Combining the requirements of AC coupling, high circuit impedance and the need for powering the ringer from the ringing signal with the requirement that the acoustic output of such a device be at least a predetermined level, it can be recognized that a satisfactory electronic ringer must exhibit a high level of circuit efficiency that is not easily attained with conventional circuit design techniques.

In addition to the above-discussed design criteria, it is desirable that an electronic ringer circuit to be readily adaptable for use in as many types of station apparatus and various installations of such apparatus as possible. In this regard, it is especially desirable that an electronic ringer be easily adaptable for use in multiparty subscriber loops such as the previously-mentioned divided ringing installations. In addition, a need often arises for a ringer that can be utilized in multiline and intercom applications such as those presented by relatively small key telephone systems. Other, more specialized situations can also be encountered such as providing a variable or adjustable ringer capable of generating a distinctive signal when operated with station apparatus at a location that includes multiple installations of various types of station equipment. If several such situations can be accommodated by a single ringer design or a design having a number of common circuit stages, both manufacture and servicing of the electronic ringer are facilitated and become more economical.

Accordingly, it is an object of this invention to provide electronic ringer apparatus operable with a variety of conventional telephone system arrangements.

It is another object of this invention to provide an efficient electronic ringer that includes circuitry for distinguishing between actual telephone ringing signals and various other electrical signals that may be present on a telephone line to thereby eliminate or substantially reduce the occurrence of the condition known as bell tap.

It is yet another object of this invention to provide an electronic ringer that meets each of the above set forth objectives and, additionally, provides a pleasant, highly discernible audible ringing signal.

Still further it is an object of this invention to provide an electronic ringer that is readily adaptable for use on multiparty subscriber loops such as divided ringing installations and is readily adaptable for use in various other telephone station installations.

SUMMARY OF THE INVENTION

These and other objects are achieved in accordance with this invention by an electronic ringer arrangement that is configured for use in various types of telephone station apparatus, wherein each embodiment of the invention utilizes a piezoelectric transducer for generating an audible signal, a tone generator circuit for driving the piezoelectric transducer, and a detector circuit for activating the tone generator circuit only when an acceptable ringing signal is present.

In accordance with the invention, each time-varying signal that is coupled to the electronic ringer by the telephone system is rectified by a rectifier-power supply circuit that is included in the detector circuit so as to provide a unidirectional (DC) signal. This unidirectional signal is coupled to a threshold monitor circuit that determines the presence of an actual ringing signal and, when such a ringing signal is present, activates a switching circuit. The switching circuit, in turn, couples the unidirectional signal being supplied by the rectifier-power supply circuit to the power supply terminals of the tone generator circuit. This causes the piezoelectric transducer to vibrate at or near its resonant frequency, thereby emitting sonic energy in response to each portion or time interval of ringing cycle which includes an alternating current signal to thereby alert the telephone subscriber of an incoming telephne call.

In accordance with further aspects of the invention, the above-mentioned switching circuit electrically connects a load impedance across the output port of the rectifier-power supply circuit whenever an acceptable ringing signal is not being supplied to the electronic ringer network, i.e., when the signal level supplied by the rectifier-power supply circuit is below a predetermined threshold value. This load impedance forms a current shunt that affects the rectifier-power supply signal transfer characteristics (i.e., circuit gain and time-related characteristics such as rise time and decay time) in a manner which allows discrimination between typical telephone ringing signals and various telephone system transient signals, including dial pulse signals that often cause inadvertent and undesirable ringing (i.e., "bell tap") in both prior art electromagnetic and prior art electronic ringer apparatus.

More specifically, the above-mentioned switching circuit of each embodiment of the invention, includes a first switching element that is normally closed or, alternatively, activated to a conductive or "ON" state whenever the signal supplied by the rectifier-power supply circuit reaches a relatively low, non-zero value. In either case, the first switching element functions to connect the above-mentioned load impedance to the output terminals of rectifier-power supply circuit and a threshold monitor circuit, which is also connected across the output port of the rectifier-power supply circuit, senses the amplitude of the unidirectional signal developed across the above-mentioned load impedance by each time-varying signal that is coupled to the electronic ringer arrangement. In each embodiment of the invention, the load impedance is selected so that the amplitude of the monitored unidirectional signal reaches a predetermined threshold value that activates a second swticing element of the switching circuit that energizes the tone generator circuit and thereby causes emission of the audible ringing signal whenever the signal coupled to the ringer is an acceptable or proper ringing signal (i.e., exhibits an amplitude and frequency that lie within a predetermined range of signal values and frequencies). When the unidirectional signal reaches the above-mentioned threshold value and activates the second switching element, the threshold monitor circuit simultaneously deactivates the first switching element to thereby disconnect the load impedance from the rectifier-power supply circuit. Removal of the load impedance alters the circuit signal transfer characteristics causing the switching circuit to remain in a stable state until termination of the ringing signal. Removal of the shunt current path through the load impedance during the period in which an audible ringing signal is being generated further increases circuit efficiency and facilitates generation of the necessary acoustic signal level.

Since the conventional telephone ringing signal consists of intervals or bursts of AC signal it can be recognized that the piezoelectric transducers of the above-described embodiments of the invention are energized and deenergized in a manner similar to the activation of electromagnetic ringing apparatus. As shall be described in more detail, such energization provides an audible signal of predetermined time duration with the frequency of the audible signal during each energized interval being determined by the piezoelectric transducer and the tone generator circuit driving the transducer. Further, since the tone generator circuit is connected to the rectifier-power supply only after detection of an acceptable ringing signal, audible signals are not generated in response to transient signals that are intentionally or unintentionally coupled to the telephone system, i.e., bell tap is prevented. Conversely and as previously mentioned, since the load impedance is disconnected from the rectifier-power supply circuit when an acceptable ringing signal is detected and the sonic signal generating circuitry is energized, the load impedance does not draw unnecessary current and relatively high efficiency is attained.

In order to provide a drive signal that causes adequate displacement or flexure of the piezoelectric transducer and thus results in the generation of sufficient acoustic energy, each tone generator circuit disclosed herein is configured so that the transducer is connected in the charging path of a capacitor that, in effect, acts as an integrator which determines the oscillation period of the sonic generating circuitry. This means that the voltage excursion or voltage swing that can be developed across the piezoelectric transducer exceeds the DC voltage supplied by the rectifier-power supply unit. This also means that the piezoelectric transducer is positioned within the frequency-determining feedback path of the tone generator circuit. Thus, the audible signal is substantially sinusoidal and exhibits a frequency equal to, or nearly equal to, the resonant frequency of the piezoelectric transducer. For example, both of the sonic signal generating arrangements or tone generators disclosed hereinafter are circuit configurations of a type normally utilized to generate square wave signals. When the piezoelectric transducer is interconnected in these circuits in the above-mentioned manner, the transducer, in effect, acts as a filter network and causes the circuit to oscillate at or near the resonant frequency of the piezoelectric transducer.

In one embodiment of the invention, wherein the rectifier-power supply circuit is a full-wave semiconductor bridge which supplies charging current to a filter capacitor, the above-discussed threshold monitor circuit and switching arrangements are realized by circuitry employing metal-oxide semiconductor field-effect transistors (MOSFET's). Because of the relatively low power requirements and the high circuit efficiency attained with this embodiment, several variations or realizations of the invention are possible that permit such an electronic ringer to be utilized in various situations and also allow the inclusion of optional features such as modulation of the acoustic signal to provide improved audibility and a more pleasant sounding sonic signal. Such audio modulation is achieved, for example, by a square wave generator circuit which drives an additional MOSFET switch that is connected in parallel with and varies the resistance of a frequency-determining resistor within the above-discussed tone generator circuit. Thus, the signal that is provided to the piezoelectric electroacoustic transducer is frequency modulated at the pulse repetition rate of the square wave generator circuit. In the presently preferred embodiments of the invention that employ such tone modulation, the square wave generator circuit operates at a relatively low pulse repetition rate and is realized with MOSFET logic circuitry exhibiting circuit topology substantially identical to that employed in the tone generator circuit.

In addition to optional circuitry for modulating the audible signal, the above-discussed embodiments can include a circuit arrangement that allows the invention to be utilized in multiparty subscriber loops of the type utilizing divided ringing, i.e., multiparty subscriber loops in which the ringer apparatus of the individual subscribers are independently and selectively activated by applying a conventional ringing signal between system common (earth ground) and one of the conductors of the two-wire communications pair (i.e., the "tip" or "ring" conductors). More specifically, in accordance with the invention, a divided-ringing detector circuit can be utilized in conjunction with the above-threshold monitor circuit to, in effect, disable the electronic ringer when the ringing signal is being directed to another subscriber or party that shares the same telephone loop. In particular, in one disclosed embodiment of such an arrangement, the divided-ringing detector circuit is a bipolar switching circuit that is connected across the output port of the rectifier-power supply circuit (and hence is connected in parallel with the previously-discussed load impedance). In this arrangement, the control terminals of the switching circuit that form the divided-ringing detector are connected to the telephone system (i.e., selectively connected between earth ground and either the tip or ring conductor of the subscriber loop) in a manner which causes the divided-ringing detector circuit to provide a low impedance path whenever a ringing signal is present between earth ground and the conductor of the telephone pair that is associated with another subscriber. This provides a current sink that prevents the potential supplied by the rectifier-power supply circuit from reaching the previously-described threshold level which activates the tone generator circuit. Thus, suitably connected embodiments of the invention that include such ringing control circuitry can be utilized within the station apparatus of subscribers in divided-ringing multiparty installations to provide an audible ringer signal only when the ringing signal provided by the telephone system central office is addressed to that particular subscriber.

Embodying the invention with a MOSFET tone generator, threshold monitor and switching circuits in the above-mentioned manner (or, alternatively, other low current circuitry) permits the invention to be readily adapted to situations in addition to the above-discussed mulitparty telephone loop. In this regard, in one disclosed embodiment of the invention the tone generator circuit is augmented with "tone-burst" circuity for causing a selectable number of audible signals to be emitted during each ringing interval of an applied ringing signal (i.e., each period of time in which a ringing signal is actually present). Thus, a distinctive audible ringing signal can be provided for each of several pieces of telephone station equipment that are installed at a single location (e.g., installed at a single place of business so as to be commonly audible). In the disclosed arrangement of such an embodiment, the tone burst circuit that establishes the number of audible signals per ringing interval is activated along with the tone generator when the threshold monitor circuit senses the presence of an acceptable ringing signal. In this arrangement, the structure of the tone burst circuit is similar to that of the tone generator circuit and to that of the above-described optional tone modulation circuit. From the operational standpoint, the tone burst circuit permits the tone generator circuit to oscillate for a predetermined period of time and then disables the tone generator circuit by clamping a circuit node within the tone generator circuit to a relatively low circuit potential (e.g., approximately zero volts DC). Following the first period of disablement, the tone burst generator alternately enables and disables the tone generator so that each ringing interval is thus partitioned into a number of periods of time in which an audible acoustic signal is generated. As is described in more detail hereinafter, tone modulation of each audible signal can be provided in an embodiment of the invention employing a tone burst generator by varying the resistance of one of the frequency-determining components within the tone generator circuit. For example, in the arrangement disclosed herein, a "ripple" signal derived from the telephone ringing signal is utilized to control a MOSFET that is connected in parallel with a resistor of the tone generator, to thereby frequency modulate the audible signal at a frequency substantially equal to the ringing signal frequency.

Although the above-discussed embodiments which employ MOSFET circuits satisfy a wide variety of applications and, because of commonality between the configuration of the rectifier-power supply circuit, the ringing detector circuit and the associated switching circuitry permit a low-cost family or series of ringer arrangements that is configured for (or is readily adaptable to) various types of telephone system installations, embodiments of the invention utilizing bipolar circuit techniques can also be advantageous. In this regard, one disclosed embodiment, which is configured to serve as a common ringer for a plurality of individual telephone lines such as the individual lines of a small key telephone system, utilizes a half-wave rectifier and bipolar detector and switching circuitry. In this embodiment, a first transistor switch, which is connected as a current sink, controls the charge and discharge rate of the rectifier-power supply filter capacitor and is activated whenever relatively low-level time-varying signals are coupled to the ringer circuit. Thus, the first transistor switch functions in a manner analogous to the first switching element and load impedance of the previously-discussed embodiments of the invention. A second transistor switch is activated to deenergize the first transistor switch and supply operating potential to a tone generator circuit whenever an acceptable ringing signal is coupled to the ringer arrangement via any one of the individual telephone lines that are coupled to the ringer. In the disclosed arrangement, the tone generator circuit utilizes a piezoelectric electroacoustic transducer connected in the charging path of a timing capacitor with all active circuit components being contained within a single operational amplifier. As an additional feature, the disclosed bipolar embodiment of the invention is configured so that the tone generator circuit can be selectively energized via an independent circuit path which enables the ringer arrangement to be activated by ancillary circuit arrangements such as an intercom system.

BRIEF DESCRIPTION OF THE DRAWINGS

Other objects and advantages of the present invention will become apparent to one skilled in the art after reading the following description taken together with the accompanying drawings in which.

DETAILED DESCRIPTION

Figure 1:
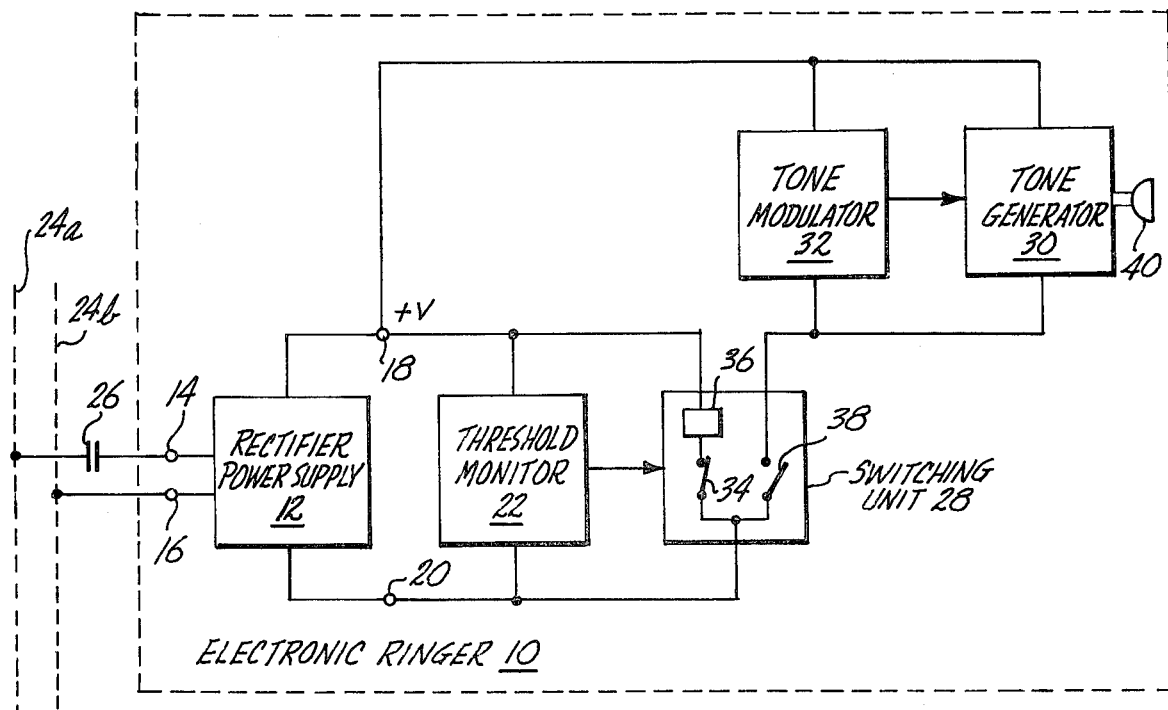
FIG. 1 is a block diagram which illustrates the broader aspects of the invention.

As is diagrammatically depicted by the block diagram of FIG. 1, the electronic ringer of this invention (generally denoted by the numeral 10) includes a rectifier-power supply circuit 12 having input terminals 14 and 16 and output terminals 18 and 20 that are connected to a threshold monitor circuit 22. Terminals 14 and 16 of rectifier-power supply circuit 12 are respectively coupled to conductors (tip and ring leads) 24a and 24b that form a two-wire transmisson line of a conventional telephone system or similar apparatus. A capacitor 26, interconnected between terminal 14 and conductor 24a, decouples electronic ringer 10 from direct current signals such as those typically utilized within a telephone system to power various station apparatus and provide supervisory functions such as off-hook detection within the central office.

In accordance with the invention, threshold monitor 22 is connected to and controls a switching unit 28, which is selectively operable to either connect a load impedance 36 across output terminals 18 and 20 of rectifier-power supply 12 or to complete a circuit path that couples the signal provided by rectifier-power supply 12 to a tone generator circuit 30 and a tone modulation unit 32. More specifically, as is diagrammatically indicated in FIG. 1, threshold monitor 22 is arranged to operate a first switching element 34 of switching unit 28 so that load impedance 36 is connected between output terminals 18 and 20 of rectifier-power supply 12 whenever the magnitude of the unidirectional or DC signal developed between terminals 18 and 20 is less than a predetermined threshold level. Although FIG. 1 symbolically depicts switch 34 as a conventional, normally-closed switch, any switching arrangement that operates in the described manner can be utilized, including an active circuit switching device that provides a conductive or "ON" state in response to either a zero value control signal or a predetermined control level that is substantially less than the above-mentioned threshold level at which the signal supplied by the rectifier-power supply 12 is to be coupled to tone generator 30 and the associated tone modulator 32. More specifically, regardless of the exact configuration of switch 34, the switching circuit 28 is arranged so that threshold monitor 22 activates switch 34 to thereby disconnect load impedance 36 from rectifier-power supply 12 and simultaneously activates a second switch 38 that completes a circuit path between rectifier-power supply output terminals 18 and 20 and the power input terminals of tone generator circuit 30 and tone modulator unit 32 as soon as the potential provided by rectifier-power supply 12 exceeds the predetermined threshold level. With the switch 38 closed, tone generator circuit 30 supplies a time-varying drive signal to a piezoelectric electroacoustic transducer 40 that causes the transducer to vibrate at an audible rate (generally equal to the resonant frequency of the piezoelectric transducer 40).

Although not necessary in the more basic embodiments of the invention, tone modulator unit 32 can be included to frequency modulate the signal provided by a tone generator circuit 30 and hence improve both the audibility and tonal characteristics of the acoustic signal generated by electroacoustic transducer 40. Further, as shall be described relative to the embodiment of the invention depicted in FIG. 3, in situations wherein a number of individual telephone lines and associated independent station sets are utilized at a single location, such as a relatively open office area, tone modulation unit 32 can be configured for establishing a preselected number of audible tone bursts during each ringing interval rather than for frequency modulation of the signal supplied by tone generator 30 and piezoelectric transducer 40. In such an embodiment of the invention, the electronic ringer used in each of the telephone sets or other type of station apparatus can be adjusted to produce a distinctive audible ringing signal thereby allowing ready determination of which piece of station apparatus is being signalled.

Turning now to the basic operation of the invention, rectifier-power supply 12, threshold monitor 22 and switching unit 28 collectively form a ringing detector circuit which, in effect, distinguishes between actual ringing signals and various other periodic and transient signals that are coupled to and propagate along the two-wire telephone transmission pair defined by conductors 24a and 24b. More specifically, in accordance with the invention load impedance 36 is configured and selected to establish the signal transfer characteristics of rectifier-power supply circuit 12 such that the magnitude of the unidirectional signal that is supplied by rectifier-power supply 12 in response to time-varying signals other than an acceptable ringing signal will be less than the previously-described threshold level (i.e., less than that signal level required to activate switch 38 and thus initiate emission of an audible ringing signal by tone generator 30 and piezoelectric transducer 40). For example, in the hereinafter described embodiments of the invention depicted in FIGS. 2 and 3, rectifier-power supply circuit 12 includes a filter capacitor that is connected between terminals 18 and 20 and load impedance 36 comprises a resistor that establishes signal transfer characteristics which prevent the filter capacitor from charging to a potential that activates switch 38 unless the time-varying signal coupled to input terminals 14 and 16 of rectifier-power supply circuit 12 exhibits both amplitude and frequency characteristics that correspond to acceptable limits for conventional telephone system ringing signals. This prevents bell tap, including bell tap or ringer response to periodic signals such as those resulting from dial pulsing and other substantial signals that may be inductively coupled to or otherwise introduced in the two-wire transmission line of a telephone system.

Figure 2:
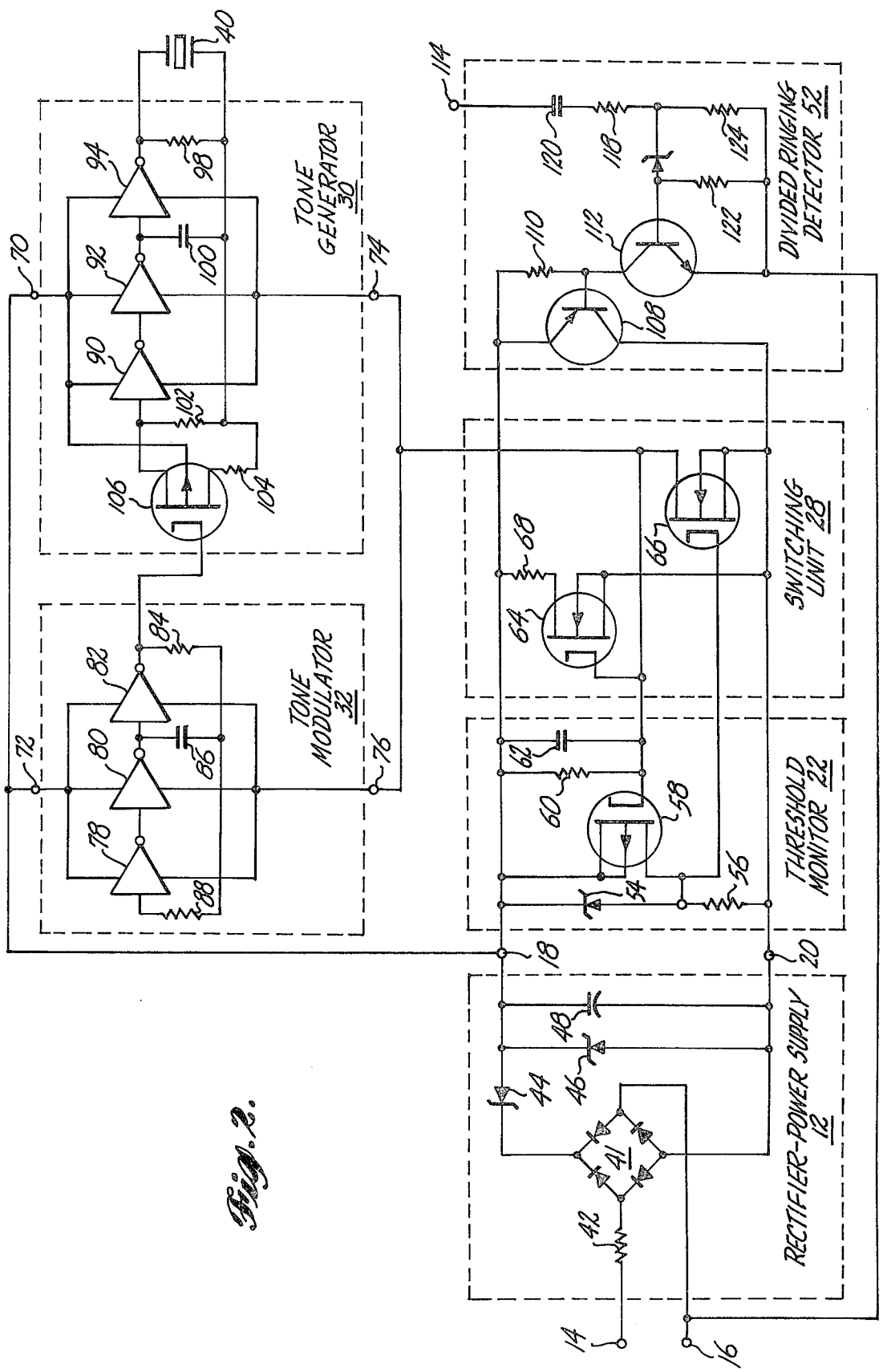
FIG. 2 is a schematic diagram which depicts a first embodiment of the invention, including an optional tone modulator circuit for frequency modulating the audible ringing signal and an optional divided-ringing detector that enables the invention to be utilized in conjunction with multisubscriber loops.

Turning now to FIG. 2, wherein the above-discussed ringing detector (rectifier-power supply 12, threshold monitor 22 and switching circuit 28) is supplemented with a divided-ringing detector 52 for detecting which subscriber of a two-party, divided-ringing installation is being signalled by the central office, rectifier-power supply unit 12 includes a full-wave semiconductor bridge rectifier 41 having the first AC input terminal thereof connected to terminal 14 via a resistor 42 and the second AC input terminal thereof connected directly to terminal 16. The negative DC terminal of bridge rectifier 41 is connected to output terminal 20 of rectifier-power supply unit 12 and the positive DC terminal of bridge rectifier 41 is coupled to output terminal 18 via a zener diode 44. A second zener diode 46 and a capacitor 48 are connected in parallel with one another between output terminals 18 and 20 of rectifier-power supply unit 12. In this arrangement, resistor 42 is typically on the order of 15 to 20 kilohms so that the minimum impedance presented by the electronic ringer is at least equal to the impedance of conventional electromechanical telephone ringers. Zener diode 44 also aids in maintaining a relatively high circuit impedance with respect to typical telephone system voice frequency signals in that zener diode 44 is selected so that voice frequency signals at power levels normally associated with a telephone system (typically 0 dbm and below) will not cause a signal level between terminals 18 and 20 that exceeds the avalanche breakdown voltage of zener diode 46. Thus, very little current flows into the electronic ringer when only voice signals (or other low level signals) are present on the telephone line. On the other hand, when more substantial signals (including ringing signals) appear between the tip and ring conductors, zener diode 46 enters avalanche breakdown to thereby limit or clamp the voltage supplied by rectifier-power supply 12 at a level suitable for reliable operation of each circuit that is powered by rectifier-power supply unit 12.

In the arrangement of FIG. 2, threshold monitor 22 includes a zener diode 54 and a resistor 56 connected in series between terminals 18 and 20 of rectifier-power supply 12 with the junction between zener diode 54 and resistor 56 being connected to the source electrode of a P-channel enhancement mode metal-oxide semiconductor field-effect transistor (MOSFET) 58. The drain and substrate electrodes of MOSFET 58 are connected to the circuit positive potential provided at terminal 18 of rectifier-power supply 12. To complete threshold monitor 22, a resistor 60 and capacitor 62 are connected in parallel with one another between the circuit positive potential (terminal 18 of rectifier-power supply 12) and the gate electrode of MOSFET 58.

The switching unit 28 of FIG. 2 includes an N-channel enhancement mode MOSFET 64 having the gate electrode thereof commonly connected to the gate electrode of threshold monitor MOSFET 58 and the drain electrode of a second enhancement mode N-channel MOSFET 66. The source and substrate electrodes of both N-channel MOSFET 64 and N-channel MOSFET 66 are connected to terminal 20 of rectifier-power supply 12 and hence are at the negative-most circuit potential. The positive-most circuit potential, supplied at terminal 18 of rectifier-power supply 12, is coupled to the drain electrode of MOSFET 64 via a resistor 68.

Comparing the arrangement of the invention depicted in FIG. 1 with the arrangement of FIG. 2 it can be seen that MOSFET 64 corresponds to switching element 34 of FIG. 1 and resistor 68 corresponds to load impedance 36. Further, it can be recognized that MOSFET 66 corresponds to switching device 38 of FIG. 1 since output terminal 18 of rectifier-power supply 12 is commonly connected to the positive supply terminals 70 and 72 of tone generator circuit 30 and tone modulator unit 32 and the negative supply voltage terminals 74 and 76 of tone generator circuit 30 and tone modulator unit 32 are commonly connected to the drain electrode of MOSFET 66. Thus, in the arrangement of FIG. 2, no operational potential is applied between the supply terminals 70 and 74 of tone generator 30 and the supply terminals 72 and 76 of tone modulator 32 unless and until rectifier-power supply circuit 12 provides operating potential and threshold monitor 22 causes MOSFET 66 to switch to (and remain in) a conductive or ON state.

In operation, each time-varying signal that propagates along the telephone line is capacitively coupled to full-wave bridge rectifier 41 via the ringer input terminals 14 and 16. If such an input signal causes the unidirectional signal supplied by full-wave bridge 41 to exceed the avalanche breakdown voltage of zener diode 44, charging current flows through capacitor 48 to thereby at least momentarily establish a positive electrical potential between output terminals 18 and 20 of rectifier-power supply 12. Since the gate electrode of N-channel enhancement mode MOSFET 64 is connected to terminal 18 via resistor 60 and the source electrode of MOSFET 64 is connected to terminal 20, each time-varying signal that causes capacitor 48 to charge to a potential that exceeds the relatively low threshold voltage of MOSFET 64 causes MOSFET 64 to enter the conductive or ON state. This connects resistor 68 between terminals 18 and 20 through the relatively high conductance drain to source path of the conducting MOSFET 64.

Recognizing that MOSFET 64 is switched into the conductive state by applied signals of an amplitude much less than that of an acceptable ringing signal, it can be seen that resistor 68 and capacitor 48 can be selected so as to establish the signal required to activate MOSFET 66 and hence energize generator 30 so that an audible signal is produced by piezoelectric transducer 40. More specifically, resistor 68 and the source to drain path of MOSFET 64 define a current shunt around capacitor 48 which controls both the charge and discharge rate of the capacitor. In particular, resistor 68 is selected to rapidly drain charge from capacitor 48 (i.e., conduct heavily) when rectifier-power supply 12 ceases to supply charging current into the circuit node formed at the junction between capacitor 48 and resistor 68. Thus, if the time-varying signal appearing across the telephone line is a transient such as an inductive spike of the type caused by dial-pulsing or any other short duration signal, capacitor 48 is rapidly discharged through resistor 68 without activating MOSFET 66 and coupling an electrical potential to tone generator 30. On the other hand, when a ringing signal is coupled to terminals 14 and 16, the current flowing through resistor 68 does not completely discharge capacitor 48 during the time intervals between the full-wave rectified signal supplied by bridge rectifier 41. Thus, capacitor 48 charges to the zener breakdown voltage of zener diode 54, which causes zener diode 54 to enter avalanche breakdown. As current begins to flow through zener diode 54, the potential at the gate electrode of MOSFET 66 increases and MOSFET 66 enters the conductive or ON state to thereby couple the electrical potential supplied by rectifier-power supply 12 to the power input terminals of tone generator 30 and tone modulator 32 (terminals 70, 72, 74 and 76).

As MOSFET 66 begins to conduct, the potential at the drain electrode thereof and, hence at the gate electrode of N channel MOSFET 64 decreases toward the potential at terminal 20 of rectifier-power supply 12 (i.e., the negative-most potential of the unidirectional signal supplied by rectifier-power supply 12). Since the source electrode of MOSFET 64 is also connected to terminal 20 of rectifier-power supply 12, MOSFET 64 is switched to a nonconducting state and current ceases to flow through resistor 68.

Moreover, since the gate electrode of P channel MOSFET 58 is connected to the drain electrode of MOSFET 66 and the source electrode of MOSFET 58 is connected to the junction between zener diode 54 and resistor 56, the gate-to-source potential of MOSFET 58 becomes negative as MOSFET 66 enters the conductive state. This causes MOSFET 58 to enter a conductive state and shunt current around zener diode 54, thus causing the potential at the gate electrode of MOSFET 66 to increase to a level approximately equal to the positive potential supplied by rectifier-power supply 12. Thus, it can be recognized that once MOSFET 66 is switched into conduction, it remains in a conductive state until capacitor 48 is almost totally discharged. This positive feedback or bootstrapping prevents the introduction of signal transients that could otherwise be coupled to tone generator 30 and tone modulator 32 and cause undesired audible signals to be introduced into the audible ringing signal. Once the ringing cycle terminates and capacitor 48 is substantially discharged, threshold monitor 22 and switching unit 28 return to the previously-described quiescent state until the application of another acceptable ringing signal.

Turning now to the realizations of tone generator 30 and tone modulator 32 that are depicted in FIG. 2, it can be noted that each of these circuits is an RC oscillator comprising three inverter circuits that are interconnected with suitable feedback elements so as to establish astable operation wherein the circuit provides an output signal of relatively constant frequency over a wide range of power supply voltages. More specifically, tone modulator circuit 32 includes three cascade connected inverters 78, 80 and 82, each having the power input terminals thereof connected to power input terminals 72 and 76 of tone modulator 32. To provide the necessary feedback, a resistor 84 and a capacitor 86 are connected in series between the output and input terminals of inverter 82 and a resistor 88 is interconnected between the input terminal of inverter 78 and the junction between resistor 84 and capacitor 86.

As is known in the art, RC oscillators of the above-described type can utilize other types of complementary-symmetry metal oxide semiconductor logic gates (or combinations thereof) which exhibit signal inversion rather than the depicted inverters 78, 80 and 82. Further, and regardless of the type of inverting circuits employed, it can be shown that such an RC oscillator provides a rectangular output signal which exhibits a duty cycle of approximately 50% (i.e., supplies a square wave) at a frequency given by the expression $$f=[2C_{86}(0.405R_{eq}+0.693R_{84})]^{-1}$$

where $R_{eq}=R_{84}R_{88}/(R_{84}+R_{88})$.

With continued reference to FIG. 2, the depicted tone generator 30 is similar to tone modulator 32 in that it includes three cascade connected inverter circuits 90, 92 and 94 wherein a resistor 98 and capacitor 100 are series connected between the output and input terminals of the final inverter 94 and a resistor 102 is interconnected between the input terminal of the first inverter 90 and the junction between the resistor 98 and capacitor 100. As was the case with tone modulator 32, the power supply terminals of each inverter are connected for receiving the unidirectional signal supplied by rectifier-power supply 12 (via power supply terminals 70 and 74 of tone generator 30).

As was described relative to tone modulator 32, a three-inverter RC oscillator of the type utilized in tone generator 30 would normally supply a square wave at a frequency determined by the capacitance value of capacitor 100 and the resistance values of resistors 98 and 102. However, both the wave-shape and frequency of the signal supplied by tone generator 30 are affected by piezoelectric transducer 40, which is connected in parallel with resistor 98, and by a resistor 104 which is connected in parallel with resistor 102 via the source-to-drain path of a P channel MOSFET 106. More specifically, piezoelectric transducers suitable for use with the invention typically exhibit a resistance at resonance on the order of a few hundred ohms and, in accordance with the invention, resistor 98 is selected to exhibit a large resistance value, i.e., resistor 98 is usually 100,000 ohms or more. Thus, it can be recognized that piezoelectric transducer 40 is the primary feedback element and resistor 98, in effect, only supplies feedback current until piezoelectric transducer 40 reaches a resonant (or near resonant) condition. Further, as is known in the art, a piezoelectric transducer such as transducer 40 is electrically equivalent to a relatively narrow band filter and thus causes tone generator 30 to not only oscillate at the resonant frequency of piezoelectric transducer 40, but also to provide a substantially sinusoidal signal.

Turning now to the manner in which resistor 104 and MOSFET 106 affects the operation of tone generator 30, it can be noted that the gate electrode is connected to the output terminal of tone modulator 32 (i.e., is connected to the output terminal of inverter 82). Thus, when an acceptable ringing signal is applied to the electronic ringer of FIG. 2 so that rectifier-power supply 12 energizes tone generator 30 and tone modulator 32, the square wave signal supplied by tone modulator 32 varies the source-to-drain conductance of MOSFET 106. Accordingly, the equivalent resistance presented by the parallel combination of resistor 102 with resistor 104 and MOSFET 106 varies at a rate substantially identical to the frequency of the signal provided by tone modulator 32. This variation in equivalent resistance value causes the frequency of the signal supplied by tone generator 32 to be modulated at the oscillation rate of tone modulator 32. For example, in one realization of the embodiment depicted in FIG. 2, capacitor 86 and resistors 84 and 88 of tone modulator 32 are selected so that tone modulator 32 supplied a square wave signal at approximately 8 hertz. In this same realization, an edge-mounted piezoelectric disc is utilized as transducer 40 with the particular arrangement employed exhibiting a resonant frequency of approximately 2,200 hertz. In order to configure tone generator 30 so that piezoelectric transducer 40 is driven at its resonant frequency when no signal is applied to the gate electrode of MOSFET 106, the values of capacitor 100 and resistors 98 and 102 of the realization being discussed are respectively 0.033 microfarads, 100 kilohms and 2.2 megohms. With the value of resistor 104 established at 47 kilohms, the square wave signal supplied by tone modulator 32 causes the frequency at which piezoelectric transducer 40 oscillates to shift on the order of 200 or 300 hertz, thus producing a modulated acoustic signal of the type that is often referred to as having a "warble" effect. Subjectively, it has been determined that the modulated acoustic signal supplied by an embodiment of the invention such as that depicted in FIG. 2 is more pleasant than and more easily discernible than either an unmodulated acoustic signal or an acoustic signal that is modulated at the frequency of the applied ringing signal (i.e., a frequency between approximately 16 hertz and 66 hertz).

As previously mentioned, divided-ringing detector 52 is an optional circuit that adapts an embodiment of the invention for use with multiparty divided-ringing installations as well as permitting the invention to be employed with single party service (bridged-ringing application). As can be seen in FIG. 2, the depicted divided-ringing detector 52 includes a PNP transistor 108 having the emitter and collector electrodes thereof respectively connected to the positive and negative output terminals (terminals 18 and 20) of rectifier-power supply 12. A resistor 110 is connected between the emitter and base electrodes of transistor 108 and the base electrode is also connected to the collector electrode of a NPN transistor 112. The emitter electrode of transistor 112 is connected to input terminal 16 of the electronic ringer and the base electrode of transistor 112 is connected to an additional input terminal 114 via a series-connected combination consisting of a zener diode 116, a resistor 118 and a capacitor 120. To complete the depicted divided-ringing detector 52, a resistor 122 is connected between the base and emitter electrodes of transistor 112 and a resistor 124 is connected between the emitter electrode of transistor 112 and the junction between zener diode 116 and resistor 118.

When an embodiment of the invention that includes a divided-ringing detector 52 is installed in a situation wherein divided-ringing is utilized to selectively address the ringers of two separate pieces of station apparatus that utilize the same line (i.e., each party's station set on a two-party, divided-ringing subscriber loop), terminal 14 of the electronic ringer is capacitively coupled to the conductor of the telephone line to which that party's ringing signal is applied, terminal 16 is connected to the other conductor of the telephone line and terminal 114 is connected to earth ground. Thus, for example, when an electronic ringer embodied in the manner depicted in FIG. 2 is installed within the station apparatus of the "tip party", terminal 14 is connected to the tip conductor of the telephone pair via a capacitor (see FIG. 1), terminal 16 is connected to the ring lead and terminal 114 is connected to earth ground. With the electronic ringer connected in this manner, divided-ringing detector 52 will not affect operation of the electronic ringer when the ringing signal is applied between terminal 14 and earth ground, but will alter circuit operation when the ringing signal is supplied between terminal 16 and earth ground. More specifically, when a ringing signal is applied between the terminals 16 and 114 (earth ground) of the embodiment of FIG. 2, current flows through the high impedance path formed by capacitor 120 and resistors 118 and 124. As the potential across resistor 124 exceeds the avalanche breakdown voltage of zener diode 116, current flows through zener diode 116 and into the base electrode of NPN transistor 112 to thereby switch transistor 112 to a conductive or ON state. This, in turn, causes current flow through resistor 110 and into the base electrode of PNP transistor 108, thereby switching transistor 108 to the ON state. Since the collector-to-emitter path of transistor 108 is connected in parallel with capacitor 48, the current supplied by bridge rectifier 41 flows through transistor 108, rather than into capacitor 48. Thus, capacitor 48 cannot charge to the threshold voltage established by threshold monitor 22 and tone generator 30 cannot be energized. On the other hand, when the ringing signal is applied between terminals 14 and 114 of the embodiment depicted in FIG. 2, very little current flows into the divided-ringing detector 52 and transistor 108 remains in the OFF state. Accordingly, divided-ringing detector 52 exerts the desired control over an electronic ringer embodied in accordance with the invention so that the ringer selectively supplies an audible signal in response to the ringing signal intended for a particular party of a divided-ringing installation. Further, an embodiment of the invention including a divided-ringing detector 52 can be utilized in bridged ringing (single party service) situations by not connecting terminal 114 to earth ground, or by interconnecting terminals 114 and 16.

Figure 3:
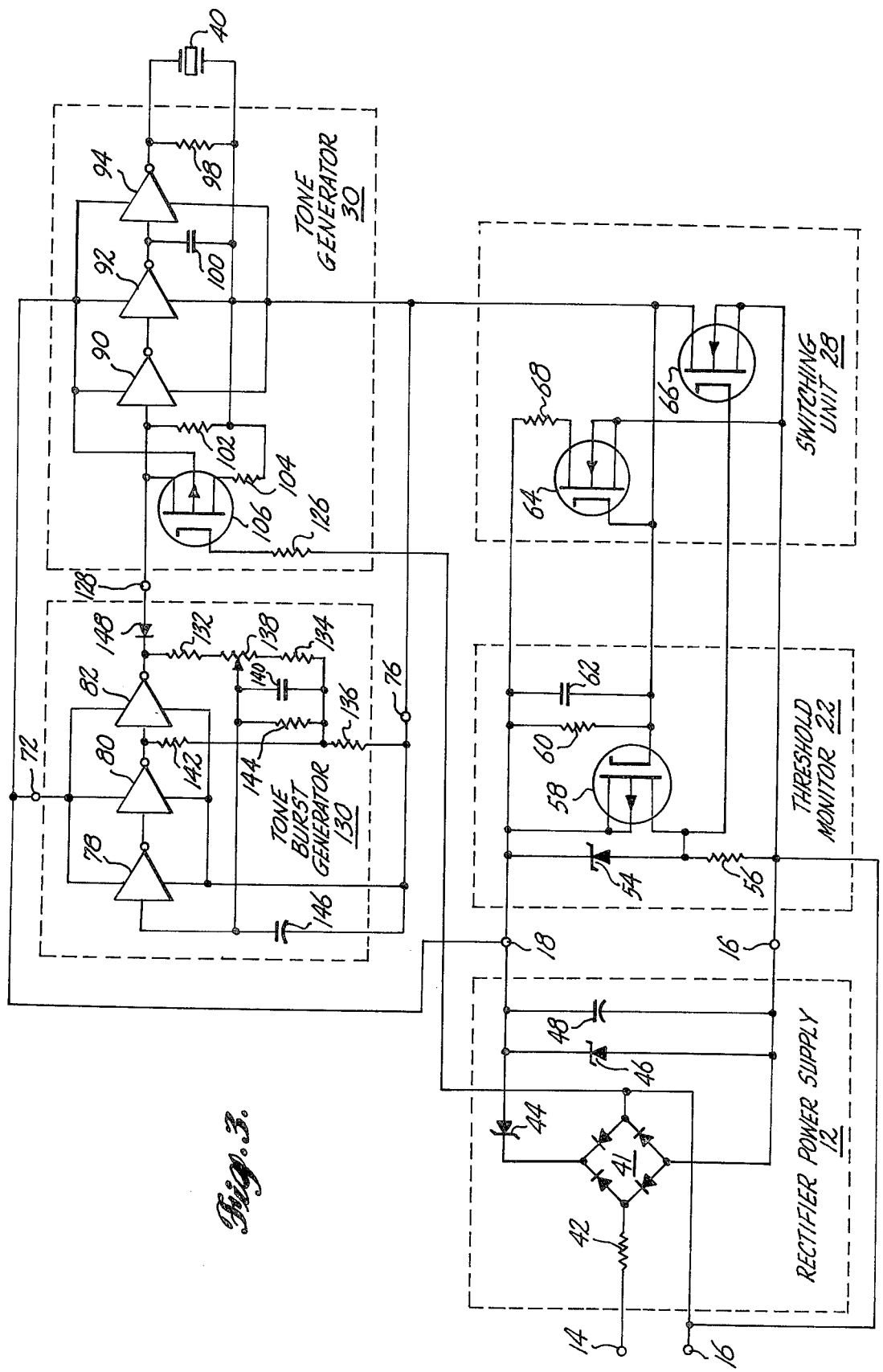
FIG. 3 schematically depicts an embodiment of the invention having various circuit stages identical to the embodiment depicted in FIG. 2 and an additional circuit stage which causes the depicted embodiment to emit a selected number of audible signals during each ringing interval.

FIG. 3 illustrates an additional embodiment of the invention that is suitable for use in a situation wherein two or more pieces of telephone equipment which are not simply operated as extensions (i.e., connected in parallel across the same telephone line), are located within hearing distance of one another and it is desired or necessary that each piece of such equipment produce a distinctive audible ringing signal. Such a situation can occur, for example, when several telephone sets or other station apparatus that operate with a number of different telephone lines are located in a common acoustic environment such as a large open office area.

Examining FIG. 3 it can be noted that the depicted rectifier-power supply 12, threshold monitor 22 and switching unit 28 are identical to the corresponding circuits of FIG. 2. Additionally, tone generator 30' of FIG. 3 differs from the tone generator 30 of FIG. 2 only in that the gate electrode of P-channel MOSFET 106 is connected to electronic ringer input terminal 16 via a resistor 126 instead of being coupled to the output terminal of a tone modulator circuit. Further, the input terminal of inverter 90 of the tone generator 30' is connected to an output terminal 128 of a tone burst generator 130, which can be selectively adjusted to generate a desired number of tone bursts during each ringing interval, thereby allowing a number of such electronic ringers to be adjusted for emission of audible signals that can be easily distinguished from one another.

With continued reference to FIG. 3, tone burst generator 130 includes three cascade connected inverter circuits 78, 80 and 82 having the power input terminals thereof connected to terminals 72 and 76. As described relative to the embodiment of FIG. 2, terminals 72 and 76 are supplied with operating potential when MOSFET 66 of switching unit 28 is caused to conduct in response to an applied ringing signal. To provide a feedback signal that causes tone burst generator 130 to oscillate, a resistive voltage divider which includes serially connected resistors 132, 134, 136 and a potentiometer 138 is connected between the output terminal of inverter circuit 82 and terminal 76 with the wiper terminal of the potentiometer 138 being connected to the input terminal of inverter 78. A timing capacitor 140 is connected between the wiper of potentiometer 138 and the junction between resistors 134 and 136. The junction between resistors 134 and 136 is also connected to the input terminal of inverter circuit 82 via a resistor 142. A resistor 144, which improves adjustment linearity of potentiometer 138 is connected in parallel with capacitor 140. A second capacitor 146, which is connected between the wiper of resistor 148 and terminal 76, prevents inadvertent triggering of the first generator 130 in response to transient or noise signals.

In operation, when an acceptable ringing signal initially switches MOSFET 66 of switching unit 28 into the conducting state, both capacitors 140 and 146 of tone burst generator 130 are discharged. Thus, the potential at the input terminal of inverter 78 is substantially zero volts, causing the signal level at the output of inverter 82 to be approximately equal to the positive potential being supplied to terminal 72 by rectifier-power supply 12. This means that diode 148, which is connected between the output of inverter 82 and the terminal 128, is reverse biased. In view of the previously-discussed operation of tone generator 30 of FIG. 2, it can thus be recognized that tone generator 30' of FIG. 3 begins to oscillate, thereby driving piezoelectric transducer 40 at its resonant frequency. With rectifier-power supply 12 supplying a potential between the terminals 72 and 76 and tone generator 30' thus causing transducer 40 to emit an audible signal, capacitor 140 of tone burst generator 130 begins to charge via resistor 132, a portion of the potentiometer 138 and resistor 136. When the voltage at the wiper of potentiometer 138 reaches the threshold voltage of inverter 78, all three inverters 78, 80 and 82 change state to thereby forward bias diode 148. This clamps the input terminal of inverter 90 of tone generator 30' to a potential slightly above the negative-most potential supplied by rectifier-power supply 12 (i.e., the potential at terminal 76) thus terminating oscillation of tone generator 30'. Capacitor 140 then discharges through resistor 132 and a portion of the potentiometer 138, causing the potential at the input of inverter 78 to drop and restore tone burst generator to its original condition wherein diode 148 is reverse biased and tone generator 30 drives piezoelectric transducer 40. Tone burst generator 130 then continues to cyclically disable tone generator 30' throughout the remaining portion of the ringing cycle, i.e., as long as rectifier-power supply 12 supplies operating potential to terminals 72 and 76. In this regard, the ratio between the time periods in which tone burst generator 130 enables and disables tone generator 30' can be set substantially equal to one another by selecting the resistance value of resistor 136 so that it is substantially less than the value of resistor 132 and 134. Further, suitably selecting the values of potentiometer 138 and resistor 144 permits a typical ringing interval to be divided into a desired number of equal length tone bursts through adjustment of potentiometer 138. For example, in one realization of the embodiment depicted in FIG. 3, tone burst generator 130 was configured so that ringing intervals of between 1 and 2 seconds could be partitioned or subdivided into one, two or three tone bursts through adjustment of the potentiometer 138.

It will be recognized by those of ordinary skill in the art that various ones of the optional features described relative to the embodiments of FIGS. 2 and 3 can be combined to provide, in effect, a family of electronic ringer circuits that are suited for many applications. Further, it will be recognized that, although the embodiments of FIGS. 2 and 3 have been discussed in terms of individual circuit modules and elements, integrated circuits can be utilized which contain several or all of the individually-discussed components. For example, in presently employed realizations of the embodiments depicted in FIGS. 2 and 3, MOSFETs 58, 64, 66 and 106 are included in a single integrated circuit that is marketed by Radio Corporation of America (RCA) under the identification number CD 4007A. In a similar manner, all six inverter circuits 78, 80, 82, 90, 92 and 94 of the presently utilized realization of the embodiments depicted in FIGS. 2 and 3 are contained in a single integrated circuit which is marketed by a number of semiconductor manufacturers under the identification number 74CO4.

Figure 4:
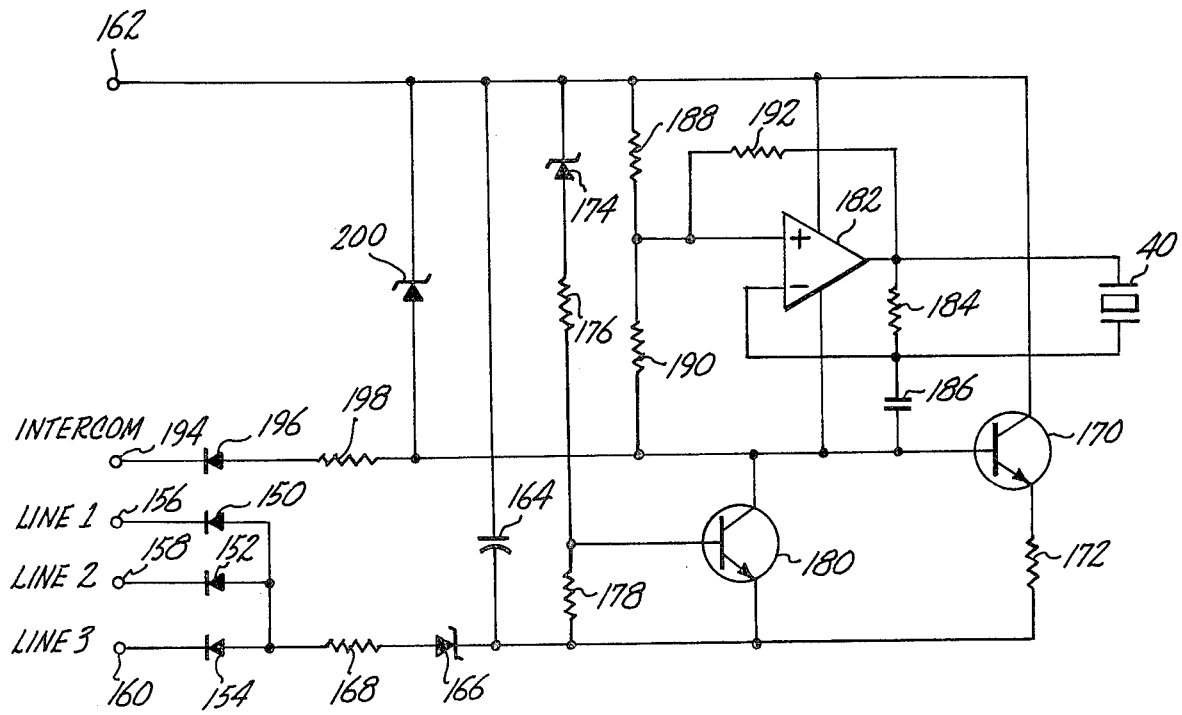
FIG. 4 schematically depicts a bipolar embodiment of the invention configured to serve as a common ringer for a number of separate telephone lines and for an intercom system.

Those of ordinary skill in the art will further recognize that it is possible to derive various other circuit arrangements which correspond to the block diagram of FIG. 1. For example, FIG. 4 illustrates an additional embodiment of the invention which utilizes bipolar transistors and provides for a common audible ringer that is activated by a plurality of individual telephone lines and, if desired, an intercom system. Such a ringer is typically utilized in applications such as a relatively small key telephone system (i.e., a key telephone system accommodating between two and seven or eight individual telephone lines). The arrangement of FIG. 4, which is configured to accommodate three separate telephone lines and an intercom signal line, includes a rectifier-power supply circuit that is formed by three diodes 150, 152 and 154 having the cathode electrodes thereof respectively connected to terminals 156, 158 and 160 and the anodes thereof commonly connected to one terminal of a resistor 168. The second terminal of resistor 168 is coupled to a terminal 162 by means of a serially connected capacitor 164 and a zener diode 166. In this arrangement, an NPN transistor 170 having the collector electrode thereof connected to the terminal 162 corresponds to the switching element 38 of the block diagram arrangement of FIG. 1. A resistor 172 connected between the emitter electrode of the transistor 170 and the junction between zener diode 166 and capacitor 164 corresponds to load impedance 36 of the arrangement described relative to FIG. 1.

To perform the function of threshold monitor 22 in FIG. 1, the arrangement of FIG. 4 utilizes the series combinaion of a zener diode 174 and resistors 176 and 178 which is connected in parallel with capacitor 164. The junction between resistors 176 and 178 is connected to the base electrode of a second NPN transistor 180, having the collector electrode thereof connected to the base electrode of transistor 170. The emitter electrode of transistor 180 is connected to the junction between capacitor 164 and zener diode 166, i.e., is connected to the negative-most circuit potential.

The tone generator portion of the arrangement of FIG. 4 is formed by an operational amplifier 182 wherein the piezoelectric transducer 40 and a resistor 184 are connected in parallel with one another between the output terminal and the inverting input terminal of operational amplifier 182. A capacitor 186 is connected from the inverting input terminal of operational amplifier 182 and the collector electrode of transistor 180. In addition, the noninverting input terminal of operational amplifier 182 is connected to the junction between two resistors 188 and 190, which are serially connected between terminal 162 and the base electrode of transistor 170. A resistor 192 is connected between the noninverting input terminal and the output terminal of operational amplifier 182.

In operation, the circuit is installed with earth ground being connected to terminal 162 and the conductors of three independent telephone lines that are supplied with the ringing signal being respectively connected to the terminals 156, 158 and 160. Thus, if a time varying signal appears on any one of the three telephone lines which causes the potential at terminal 156, 158 or 160 to decrease below the potential at terminal 162, current flows through the capacitor 164, zener diode 166, resistor 168 and the associated diode 150, 152 or 154. As the voltage across capacitor 164 begins to increase, current flows through the series combination of resistors 188 and 190 and into the base electrode of transistor 170. Thus, transistor 170 switches to the ON state as soon as capacitor 164 charges to a relatively low value. This completes a circuit path through resistor 172 which shunts a portion of the current that charges capacitor 164. More importantly, if the signal on the telephone line which is generating the charging current terminates rather abruptly, the current path established by transistor 170 through resistor 172 rapidly discharges capacitor 164. As was described relative to the arrangement of FIG. 1, this prevents transients such as those caused by dial pulsing from energizing the tone generator portion of the system and thus prevents the emission of undesirable audible ringing signals (i.e. bell tap).

Assuming that an acceptable ringing signal is being applied to the electronic ringer of FIG. 4, the tone generator portion of the arrangement is activated when transistor 180 is switched to the ON state. This occurs when the voltage across capacitor 164 causes zener diode 174 to enter the avalanche breakdown region which, in turn, causes current to flow into the base electrode of 180. Since the collector emitter path of transistor 180 forms a current path that shunts resistor 172 and the base emitter junction of transistor 172, transistor 170 is turned OFF as transistor 180 enters the ON state.

The tone generator portion of the arrangement of FIG. 4 is functionally similar to the tone generator circuits utilized in the embodiments of FIGS. 2 and 3 in that a similar circuit arrangement is often utilized as a square wave generator. Such a circuit is disclosed, for example, at page 374 of *Operational Amplifiers, Design and Applications*, by Tobey, Graeme and Huelsman, 1971, which is published by McGraw Hill. As is the case with the previously described MOSFET tone generator 30 of FIGS. 2 and 3, the piezoelectric transducer 40 is connected in parallel with a resistor which normally determines the frequency of oscillation (resistor 184) and is connected in series with the timing capacitor (capacitor 186) so that the voltage swing developed across piezoelectric transducer 40 exceeds the potential supplied to operational amplifier 182 by the rectifier-power supply circuit (i.e., the potential across capacitor 164). As was also the case with the previously described MOSFET tone generators discussed relative to the embodiments of FIGS. 2 and 3, the above-described interconnection of piezoelectric transducer 40 causes the tone generator to supply a substantially sinusoidal drive signal at the resonant frequency of piezoelectric transducer 40.

In view of the above-described structure of FIG. 4, it can be recognized that when a ringing signal is coupled to terminal 156, 158 or 160, capacitor 164 charges to a potential which, in turn, causes transistor 180 to conduct. As long as the ringing signal is present, capacitor 164 provides operating current to operational amplifier 182 to thereby drive piezoelectric transducer 40 at its resonant frequency. If desired, capacitor 164 can be selected so that the potential supplied to operational amplifier 182 includes sufficient ripple signal to cause modulation of the drive signal supplied to transducer 40 at the ringing signal frequency. In any case, the arrangement of FIG. 4 causes piezoelectric transducer 40 to oscillate during substantially each portion of a ringing cycle in which the AC ringing signal is present. Thus, the arrangement of FIG. 4 operates in a manner comparable to a conventional electromagnetic telephone ringer and the embodiment of FIG. 2.

Further, the electronics of FIG. 4 can be activated by applying either a negative DC potential or an AC signal to a terminal 194 which is coupled to earth ground (terminal 162) by means of serially connected diode 196, resistor 198 and zener diode 200. In this regard, since zener diode 200 is connected across the power input terminals of operational amplifier 182, the electronic ringer will supply an audible signal as long as a suitable signal is coupled to terminal 194 with the transducer 40 oscillating a single frequency in response to an applied DC signal and being modulated at a rate equal to the frequency of an applied AC signal.

In view of the foregoing description, those of ordinary skill in the art will recognize that variations in the details of the embodiments depicted herein may be made without departing from the scope and the spirit of the invention. For example, a separate tone modulator or tone burst generator such as those described relative to FIGS. 2 and 3 could be added to the embodiment of FIG. 4, if desired or necessary.

The embodiments of the invention in which an exclusive property or privilege is claimed are defined as follows:

1. An electronic ringer connectable to first and second conductors for supplying an audible signal in response to a ringing signal having an amplitude within a predetermined range of signal levels and a frequency that lies between an upper and lower frequency limit, said electronic ringer comprising:
    tone generating means for supplying an audible signal in response to an applied signal, said tone generating means including a piezoelectric transducer and an astable multivibrator having a first capacitor that at least partially establishes the frequency of the signal supplied by said astable multivibrator, said piezoelectric transducer being connected in the charging path of said capacitor;
    signal rectifier means responsive to said ringing signal and other time-varying signals propagating along said first and second conductors, said signal rectifier means for supplying a unidirectional signal representative of each said time-varying signal;
    threshold monitoring means responsive to said unidirectional signal supplied by said signal rectifier means for supplying a control signal when said unidirectional signal exceeds a predetermined level;
    switching means responsive to said control signal supplied by said threshold monitoring means, said switching means including a load impedance and means for coupling said unidirectional signal to said load impedance whenever said control signal is not supplied by said threshold monitoring means, said switching means further including means for substantially eliminating said coupling of said unidirectional signal to said load impedance and coupling said unidirectional signal to said tone generating means as said applied signal when said threshold monitoring means supplies said control signal; and,
    divided ranging detector means for adapting said electronic ringer for use in a divided ringing installation wherein said ringing signal is alternatively supplied between said first conductor and a common potential or between said second conductor and said common potential, said divided ringing detector means being arranged for connection to one of said first and second conductors and for connection to said common potential, said divided ringing detector means including means for limiting said unidirectional signal to a value less than said predetermined value when said ringing signal is suplied between said common potential and that one of said first and second conductors to which said divided ringing detector means is connected.

2. The electronic ringer of claim 1 further comprising tone modulator means, said tone modulator means being connected to said tone generating means and being responsive to said control signal supplied by said threshold monitoring means, said tone modulator means including means for supplying a modulation signal to said tone generator means to frequency modulate said audible signal when said threshold monitoring means supplies said control signal.

3. The electronic ringer of claims 1 or 2 wherein said signal rectifier means includes a full-wave bridge circuit and a filter capacitor, said full-wave bridge circuit having first and second output terminals, the first and second electrodes of said filter capacitor being respectively coupled to said first and second output terminals of said full-wave bridge circuit.

4. The electronic ringer of claim 3 wherein said signal rectifier means further includes first and second zener diodes, said first zener diode being connected in parallel with said filter capacitor, said second zener diode forming a circuit path that connects said filler capacitor and said first zener diode to said first output terminal of said full-wave bridge circuit.

5. The electronic ringer of claim 4 wherein said load impedance comprises a first resistor and said switching means comprises first and second field-effect transistors, each of said first and second field-effect transistors having a source electrode, a drain electrode and a gate electrode, said first resistor being connected between said drain electrode of said first field-effect transistor and the junction between said first and second zener diodes of said signal rectifier means, said source electrodes of said first and second field-effect transistors being commonly connected to said second output terminal of said full-wave bridge circuit within said signal rectifier means, said drain electrode of said second field-effect transistor being connected for coupling said unidirectional signal to said tone generator means, said gate electrode of said second field-effect transistor being connected for receiving said control signal supplied by said threshold monitoring means, said gate electrode of said first field-effect transistor being connected to said drain electrode of said second field-effect transistor and being connected for receiving said unidirectional signal.

6. The electronic ringer of claim 5 wherein said threshold monitoring means includes a third zener diode and a second resistor that are serially connected with one another between said second output terminal of said full-wave bridge circuit and the junction between said first and second zener diodes, the junction between said third zener diode and said second resistor being connected to said gate electrode of said second field-effect transistor of said switching means to provide said control signal.

7. The electronic ringer of claim 6 wherein said threshold monitoring means further includes a third field-effect transistor having a drain electrode, a source electrode and a gate electrode, said drain electrode of said third field-effect transistor being connected to the junction between said first and second zener diodes, said source electrode of said third field-effect transistor being connected to said junction between said third zener diode and said second resistor, said gate electrode of said third field-effect transistor being connected to said drain electrode of said second field-effect transistor, said threshold monitoring means further including a third resistor connected between said gate and drain electrodes of said third field-effect transistor for coupling said unidirectional signal to said gate electrode of said first field-effect transistor of said switching means.

8. The electronic ringer of claim 7 wherein said astable multivibrator of said tone generating means includes first, second and third signal inverting means, a fourth resistor and a fifth resistor; said first, second and third signal inversion means each having an input terminal, an output terminal, and first and second terminals for receiving an operating potential, said first terminal for receiving an output potential of each of said first, second and third signal inverting means being connected to said drain electrode of said second field-effect transistor within said switching means, said second terminal for receiving an operating potential of said first, second and third signal inverting means being connected to said junction between said first and second zener diodes of said signal rectifier means, said output terminal of said first signal inverting means being connected to said input terminal of said second inverting circuit means, said output terminal of said second signal inverting means being connected to said input terminal of said third inverting signal inverting means, said fourth resistor being serially connected with said first capacitor between said output and input terminals of said third signal inverting means, said fifth resistor being connected between said input terminal of said first signal inverting means and the junction between said fourth resistor and said first capacitor, said piezoelectric transducer being connected in parallel with said fourth resistor.

9. The electronic ringer of claim 8 wherein said tone generating means further comprises a fourth field-effect transistor having a drain electrode, a gate electrode and a source electrode, said drain electrode of said fourth field-effect transistor being connected to said input terminal of said first signal inverting means, said source electrode of said fourth field-effect transistor being coupled to said junction between said fourth resistor and said first capacitor, said gate electrode of said fourth field-effect transistor being connected for receiving said modulation signal supplied by said tone modulator means, said fourth field-effect transistor providing a current path in parallel with said fifth resistor to vary the frequency of said astable multivibrator at a rate determined by the frequency of said modulation signal supplied by said tone modulator means.

10. The electronic ringer of claim 9 wherein said tone modulator means comprises fourth, fifth and sixth signal inverting means each having an input terminal, an output terminal and first and second terminals for receiving an operating potential, said first terminals for receiving an operating potential of said fourth, fifth and sixth signal inverting means being commonly connected to said drain electrode of said second field-effect transistor within said switching means, said second terminal for receiving an operating potential of said fourth, fifth and sixth signal inverting means being commonly connected to said junction between said first and second zener diodes within said signal rectifier means, said output terminal of said fourth signal inverting means being connected to said input terminal of said fifth signal inverting means, said output terminal of said fifth signal inverting means being connected to said input terminal of said sixth signal inverting means, said output terminal of said sixth signal inverting means being connected to said gate electrode of said fourth field-effect transistor within said tone generating means; said tone modulator means further comprising a second capacitor and a sixth and seventh resistor, said sixth resistor being serially connected with said second capacitor between said input and output terminals of said sixth signal inverting means, said seventh resistor being connected between said input terminal of said fourth signal inverting means and the junction between said sixth resistor and said second capacitor.

11. The electronic ringer of claim 9 wherein said tone modulator means includes said full-wave bridge circuit, said filter capacitor and an eighth resistor connected between one input terminal of said full-wave bridge circuit and said gate electrode of said fourth field-effect transistor, said filter capacitor being selected to supply a ripple signal sufficient to frequency modulate said tone generating means at a rate substantially equal to the frequency of said ringing signal.

12. The electronic ringer of claim 11 further comprising tone burst generator means for successively enabling and disabling said tone generating means during each period of time in which said ringing signal continuously propagates along said first and second conductors, said tone burst generator means including means for selectively establishing the duration of the time periods in which said tone generating means is enabled and disabled to permit adjustment of said electronic ringer for emission of a predetermined number of tone bursts when a ringing signal of predetermined duration propagates along said first and second conductors.

13. The electronic ringer of claim 12 wherein said tone burst generator means comprises seventh, eighth and ninth signal inverting means each having an input terminal, an output terminal and first and second terminals for receiving an operating potential, said first terminal for receiving an operating potential of said seventh, eighth and ninth signal inverting means being connected to said drain electrode of said second field-effect transistor within said switching means, said second terminal for receiving an operating potential of said seventh, eighth and ninth signal inverting means being connected to said junction between said first and second zener diodes of said signal rectifier means, said output terminal of said seventh signal inverting means being connected to said input terminal of said eighth signal inverting means, said output terminal of said eighth signal inverting means being connected to said input terminal of said ninth signal inverting means, said output terminal of said ninth signal inverting means being coupled to said input terminal of said first signal inverting means of said tone generating means; said tone burst generator means further including a resistive voltage divider interconnected between said drain electrode of said second field-effect transistor within said switching unit and said output terminal of said ninth signal inverting means, said resistive voltage divider including a potentiometer having the wiper electrode thereof connected to said input terminal of said seventh signal inverting means; said tone burst generator means further including a third capacitor connected between said input terminal of said seventh signal inverting means and said drain electrode of said second field-effect transistor within said switching means.

14. The electronic ringer of claim 1 wherein:
said tone generating means include a first operational amplifier having an inverting input terminal, a noninverting input terminal, an output terminal and first and second terminals for receiving an operating potential; ninth and tenth resistors serially connected between said first and second terminals of said operational amplifier for receiving an operation potential; an eleventh resistor connected between said non-inverting terminal and said output terminal of said operational amplifier; a twelfth resistor and a fourth capacitor serially connected with one another between said output terminal of said operational amplifier and said first terminal for receiving an operating potential; and, a piezoelectric transducer connected in parallel with said twelfth resistor; said noninverting input terminal being further connected to the function between said ninth and tenth resistors; and said inverting input terminal of said operational amplifier being connected to the junction between said twelfth resistor and said fourth capacitor;
said signal rectifier means includes a second filter capacitor, a fourth zener diode, and a first rectifier diode connected in series with one another with a first electrode of said second filter capacitor being connected to said operational amplifier second terminal for receiving an operating potential, said first electrode of said second filter capacitor being further connected to a first terminal for receiving said ringing signal, said rectifier diode being connected to a second terminal for receiving said ringing signal;
said threshold monitoring means including a fifth zener diode, and thirteenth and fourteenth resistors serially connected between said first terminal for receiving said ringing signal and the second electrode of said second filter capacitor; and wherein, said switching means includes first and second bipolar transistors, each having a collector electrode, a base electrode and an emitter electrode, said emitter electrode of said first bipolar transistor being connected to said second terminal of said second filter capacitor, said base electrode of said first bipolar transistor being connected to the junction between said thirteenth and fourteenth resistors, said collector electrode of said first bipolar transistor and said base electrode of said second bipolar transistor being commonly connected to said operational amplifier first terminal for receiving an operating potential, said collector electrode of said second bipolar transistor being connected to said first electrode of said second filter capacitor, said switching means further including a fifteenth resistor for defining said load impedance, said fifteenth resistor being connected between said emitter electrode of said second bipolar transistor and said second electrode of said second filter capacitor.

15. The electronic ringer of claim 14 further comprising a plurality of rectifier diodes, each having one electrode thereof connected to the corresponding electrode of said first rectifier diode, each diode within said plurality of rectifier diodes being connectable to separate conductors associated with independent ringing signals to activate said tone ringer whenever any one of said independent ringing signals is present.

16. The electronic ringer of claim 15 further comprising means for activating said tone ringer with a DC signal that exceeds a predetermined magnitude.

17. The electronic ringer of claim 16 wherein said means for activating said electronic ringer with a DC signal includes a sixth zener diode and a fifteenth resistor serially connected with one another, said cathode of said sixth zener diode being connected to said operational amplifier first terminal for receiving an operating potential, said sixteenth resistor being connected for receiving said DC signal for activating said electronic ringer.

18. An electronic ringer circuit responsive to a ringing signal supplied to first and second conductors of a communication system, said electronic ringer comprising:
a rectifier-power supply unit including a filter capacitor, first and second zener diodes, and a full-wave rectifier circuit having first and second input terminals and first and second output terminals, said first and second terminals of said full-wave rectifier circuit being respectively coupled to said first and second conductors for receiving said ringing signal, said first and second zener diodes being connected in series with one another between said first and second output terminals of said full-wave rectifier circuit, said filter capacitor being connected in parallel with said first zener diode;
a signal monitoring unit responsive to the signal developed across said filter capacitor, said signal monitoring unit including a serially connected third zener diode and first resistor that are connected in parallel with said filter capacitor;
a switching unit for providing a circuit path to a first electrode of said filter capacitor and for alternatively interconnecting a predetermined load impedance in parallel with said filter capacitor, said switching unit including first and second N-channel enhancement mode field-effect transistors and a second resistor, said second resistor being connected between the drain electrode capacitor, the source electrodes of both said first and second field-effect transistors being connected to said first electrode of said filter capacitor, the gate electrode of said first field-effect transistor being connected to the drain electrode of said second field-effect transistor and being coupled to said second electrode of said filter capacitor, said drain electrode of said second field-effect transistor being connected for providing said circuit path to said first electrode of said filter capacitor; and, tone generating means for supplying an audible signal, said tone generating means including a first and second terminal for applying an operating potential, said tone generating means emitting said audible signal when a signal of predetermined magnitude is applied between said first and second terminals for receiving an operating potential, said first terminal for receiving an operating potential being connected to said second electrode of said filter capacitor and said second terminal for receiving an operating potential being connected to said drain electrode of said second field-effect transistor.

19. The electronic ringer of claim 18 wherein said signal monitoring unit further includes a P-channel enhancement mode field-effect transistor having a drain electrode, a source electrode and a gate electrode, said gate electrode of said P-channel field-effecct transistor being connected to said drain electrode of said second field-effect transistor within said switching unit, said source electrode of said P-channel field-effect transistor being connected to the junction between said third zener diode and said first resistor, said drain electrode of said P-channel field-effect transistor being connected to said second electrode of said filter capacitor; and wherein said electronic ringer further includes a third resistor connected between said second electrode of said filter capacitor and said gate electrode of said first field-effect transistor.

20. The electronic ringer of claim 19 further comprising tone modulator means having an output terminal and first and second terminals for applying an operating potential, said tone modulator means including means for supplying a periodic signal to said output terminal when an operating potential of predetermined magnitude is applied to said first and second terminals for receiving an operating potential, said output terminal of said tone modulator means being connected to said tone generating means, said first terminal for receiving an operating potential being connected to said second electrode of said filter capacitor, said second terminal for receiving an operating potential being connected to said drain electrode of said second field-effect transistor within said switching unit.

21. The electronic ringer of claims 19 or 20 further comprising divided ringing detector means for adapting said electronic ringer for use in a divided ringing installation wherein said ringing signal is alternatively supplied between said first conductor of said communication signal and a common potential or between said second conductor of said communication system and said common potential, said divided ringing detector including an input terminal and first and second output terminals, said first and second output terminals being connected to said first and second electrodes of said filter capacitor, said divided ringing detector including means for providing a low impedance path between said first and second output terminals when a ringing signal is applied between said input terminal of said divided ringing detector and said first input terminal of said full-wave rectifier circuit, said divided ringing detector means further including means for providing a high impedance path between said first and second output terminals when a ringing signal is applied between said input terminal of said divided ringing detector and said second input terminal of said full-wave rectifier circuit.

22. The electronic ringer of claim 21 wherein said tone generating means includes a piezoelectric transducer and a multivibrator circuit having a first capacitor that at least partially establishes the frequency of the signal provided by said multivibrator circuit, said piezoelectric transducer being connected in the charging path of said capacitor.

* * * * *

UNITED STATES PATENT AND TRADEMARK OFFICE
CERTIFICATE OF CORRECTION

PATENT NO. : 4,367,376
DATED : January 4, 1983
INVENTOR(S) : Darryl F. Proctor et al.

It is certified that error appears in the above—identified patent and that said Letters Patent is hereby corrected as shown below:

Column 2,   line 7: "telepone" is changed to --telephone-- line 20: "riging" is changed to --ringing--

Column 6,   line 19: "circuity" is changed to --circuitry-- line 65: "mulitparty" is changed to --multiparty-- lines 67 & 68: "circuity" is changed to --circuitry--

Column 20,  line 33: "suplied" is changed to --supplied-- line 56: "filler" is changed to --filter--

Signed and Sealed this

Seventh Day of June 1983

[SEAL]

Attest:

DONALD J. QUIGG

*Attesting Officer*   *Acting Commissioner of Patents and Trademarks*